United States Patent [19]

Maher et al.

[11] Patent Number: 4,551,016

[45] Date of Patent: Nov. 5, 1985

[54] VACUUM PRINTER

[75] Inventors: Robert J. Maher, Auburn Heights; Ronald Tooson, Inkster, both of Mich.

[73] Assignee: Douthitt Corporation, Detroit, Mich.

[21] Appl. No.: 654,419

[22] Filed: Sep. 26, 1984

[51] Int. Cl.$^4$ ............................................. G03B 27/20
[52] U.S. Cl. ....................................................... 355/91
[58] Field of Search .............................. 355/61, 91–94, 355/73, 76

[56] References Cited

U.S. PATENT DOCUMENTS

| | | | |
|---|---|---|---|
| 2,257,581 | 9/1941 | Ulsheimer | 355/93 |
| 2,270,578 | 1/1942 | Campbell | 355/94 |
| 2,287,228 | 6/1942 | Campbell | 355/93 |
| 2,376,416 | 5/1945 | Campbell | 355/61 |
| 2,494,282 | 1/1950 | Campbell | 355/93 |
| 3,106,145 | 10/1963 | Hutchins | 355/93 |
| 3,995,955 | 12/1976 | Töpfer | 355/91 |

FOREIGN PATENT DOCUMENTS 2356842  5/1975  Fed. Rep. of Germany ........ 355/93

Primary Examiner—Russell E. Adams
Assistant Examiner—Brian W. Brown
Attorney, Agent, or Firm—Cullen, Sloman, Cantor, Grauer, Scott & Rutherford

[57] ABSTRACT

In a vacuum printer for the graphic arts having a bed, a blanket frame upon the bed including a flexible impervious blanket having a peripheral sealing bead, a glass frame including a glass, with the glass in snug flexing and sealing registry with the blanket bead defining a contact printing chamber, the glass frame being movably mounted for opening and closing movements relative to the blanket frame, and a vacuum source having a first vacuum conduit communicating with the printing chamber for evacuating it; the improvement which comprises a non-metallic base plate positioned within and yieldable mounted upon the blanket frame supportably underlying the blanket. A flexible apertured skirt at its outer and inner periphery is sealed respectively upon the blanket frame and the base plate, defining with the blanket a vacuum chamber connected by a second conduit to the first conduit. A control is connected to the second conduit to simultaneously evacuate the vacuum chamber for a limited interval, and regulate its vacuum level by the controlled flow air into the vacuum chamber during its evacuation.

20 Claims, 5 Drawing Figures

VACUUM PRINTER

RELATED PATENT APPLICATION

Copending application Ser. No. 460,673 filed Jan. 24, 1983 For Vacuum Printer, now U.S. Pat. No. 4,484,813.

BACKGROUND OF THE INVENTION

Vacuum contact printing for the graphic arts is well known and wherein upon a bed there is normally mounted in a horizontal position a blanket frame which includes a flexible impervious blanket having a peripheral bead. A glass frame is positioned above the blanket frame and adapted for snug registry with its bead for defining a contact printing chamber between the glass frame and blanket. Hinges or other linkage interconnect the glass frame with the blanket frame so that the glass frame may be pivoted or otherwise elevated with respect to the blanket frame in order to permit loading upon the blanket of a light sensitive sheet and thereover a negative. A vacuum source is provided having a conduit for providing vacuum communication to the printing chamber. After a predetermined period the flexible blanket of the blanket frame is drawn tightly and snugly up against the glass of the glass frame after which a light is presented to the frame assembly either in a horizontal or vertical position for exposing the sensitized sheet or plate. Examples of that type of vacuum printer are shown in the following United States prior art patents:

| U.S. PAT. NO. | DATE | NAME |
| --- | --- | --- |
| 2,287,228 | June 23, 1942 | J. T. Cambell |
| 2,376,416 | May 22, 1945 | J. T. Cambell |
| 2,494,282 | January 10, 1950 | J. T. Cambell |
| 2,270,578 | January 20, 1942 | J. T. Cambell |
| 3,106,145 | October 8, 1963 | L. Hutchins |

Most of the foregoing patents show the relationship between a flexible blanket within a blanket frame and the glass of the overlying glass frame wherein the chamber between the two frames, sometimes referred to as a vacuum printing chamber, is evacuated so as to establish a good contact between the negative and the sensitized sheet and the glass frame at the time that it is exposed by the momentary application of the source of light.

The problem has heretofore existed that though every effort is made to completely evacuate the vacuum chamber to establish a snug contact between the flexible blanket and the glass of the glass frame, it appears that though not intended in many cases, the initial application of vacuum to the vacuum chamber moves such portions of the blanket with respect to the glass of the glass frame that air is actually entrapped within the vacuum chamber, preventing perfect contact. This occurred because the vacuum started at the perimeter of the frames and moved toward the center.

This is productive of exposed negatives which are not one hundred percent effective due to a lack of a perfect contact between the glass and blanket and the negative and sensitized sheet therebetween.

In the prior art patents are practiced considerable difficulty has been encountered in attempting to obtain a complete evacuation of all of the air between the glass and blanket frames hopefully to obtain perfect exposure photographically on to the sensitized sheet. Efforts have been made to provide a more complete evacuation of the vacuum printing chamber.

In the copending application provision is made for a vacuum printer which obtained almost perfect and fast evacuation of air from the printing chamber. This was accomplished by an initial application of vacuum to the blanket chamber holding the blanket down upon the base plate.

The invention described in the copending patent application is prone to certain operational problems of the vacuum frame. There were two types of glass breakage. One was shattering of the glass from implosion. This shattering is the result of external air pressure on the outside of the glass not being countered by a sufficient degree of air pressure on the blanket side of the glass. This "breaking force" results because the blanket is being held away from the glass by vacuum in the blanket chamber during the initial evacuation of air from the printing chamber. Therefore, the air pressure in the printing chamber is reduced below that of the external atmospheric air pressure on the outside of the glass. The result is the "uneven air pressure". This breaking force is relieved once the blanket has risen to the glass and the blanket chamber is restored to atmospheric pressure.

There is no significant "breaking force" in standard vacuum frames because the blanket, which is not held away, rises almost immediately, and the atmospheric pressure is in contact with the outside of the blanket throughout the operation of the unit. Thus, the atmospheric pressure is transmitted from the blanket to the blanket side of the glass.

The severity of the "breaking force" is dictated by the level of vacuum achieved in the blanket chamber. This is apparent since the blanket chamber vacuum level determines at what level of printing chamber vacuum the blanket begins to rise. Obviously, the blanket will rise when the printing chamber vacuum level is somewhat greater than the blanket chamber vacuum level. The force of gravity must be counter-acted to lift the blanket.

The other type of glass breakage is what will be referred to as a "pin break". The graphic arts industry makes use of metal register pins placed into the printing chamber to hold the various pieces of work in the proper position. A register pin interferes with the normal flexing of the glass which results from the "uneven air pressure". Thus, the glass tries to flex around the pin which is being pressed hard against the immovable aluminum plate. Depending upon the size and location of the pin, the glass may break at the pin location.

SUMMARY OF THE INVENTION

It is an important feature of the present invention to provide an improved vacuum printer for the graphic arts and wherein a mechanism is employed which will assure and achieve a perfect and fast evacuation of the air between the glass and blanket frames.

An important feature of the present invention is to eliminate glass implosion by a more precise control of the vacuum level within the vacuum or blanket chamber.

Another feature is to eliminate glass "pin breaks" by providing a yieldable base plate within the blanket frame upon which the blanket is yieldably mounted and supported.

A further feature is to reduce the time it takes to achieve perfect printing contact of the material to be exposed. In the copending application above reduction of time to achieve perfect contact was an objective therein.

An important feature of the present vacuum printer is to still further reduce time for achieving perfect contact for the printing chamber and wherein the initial time delay for initially evacuating the blanket chamber has been eliminated.

A further feature for eliminating "pin breaks" includes the use of a polyvinyl chloride hereafter referred to as PVC cartridge or base plate which is non-metallic and which is yieldably and uniformly supported upon a plurality of coil springs for yieldably mounting and supporting the blanket of the blanket frame.

A further feature therefore provides a light PVC cartridge or base plate so that a light force upon the blanket will cause the PVC cartridge to move downward pressing the series of uniformly spaced support springs upon the blanket frame. The movable base plate is thus yieldably mounted to receive the force on the register pins in the printing chamber. Thus, when the glass begins to flex because of the uneven air pressure, the pin or pins will not interfere with the flexing of the glass. The pins will be lowered by the compression of the plate and the glass will be able to behave in the manner similar to the case where no pins are employed in the printing chamber.

It is a further feature to provide a precise control of the blanket cavity vacuum level by employing a series of vacuum bleed screws which extend through the PVC cartridge. These bleed screws allow an in flow of air into the vacuum chamber at the same time as that chamber is being continuously evacuated. By regulating the inward flow of air into the vacuum chamber, the vacuum may be preset at a desired level. Thus the air flow through the vacuum pump line is exactly equal to the inward air flow through the bleed screws.

It is a further feature of controlling the level of vacuum in the vacuum cavity or blanket cavity so that the level is achieved quickly. Constricted vacuum pump flow as in the copending application is no longer needed as a means to control cavity vacuum. The desired cavity vacuum is also achieved quicker because there is less volume of air to be evacuated within the blanket chamber than in the copending application.

An important feature is to provide an improved electrical and pneumatic system which eliminates one of the control valves and one of the timers of the copending application and provides a more simplified pneumatic electrical circuitry.

These and other features and objects will be seen from the following Specification and claims in conjunction with the appended drawings.

THE DRAWINGS

It will be understood that the above drawings illustrate merely a preferred embodiment of the invention and that other embodiments are contemplated within the scope of the claims hereafter set forth.

DETAILED DESCRIPTION OF AN EMBODIMENT OF THE INVENTION

The Prior Art

Figure 1:
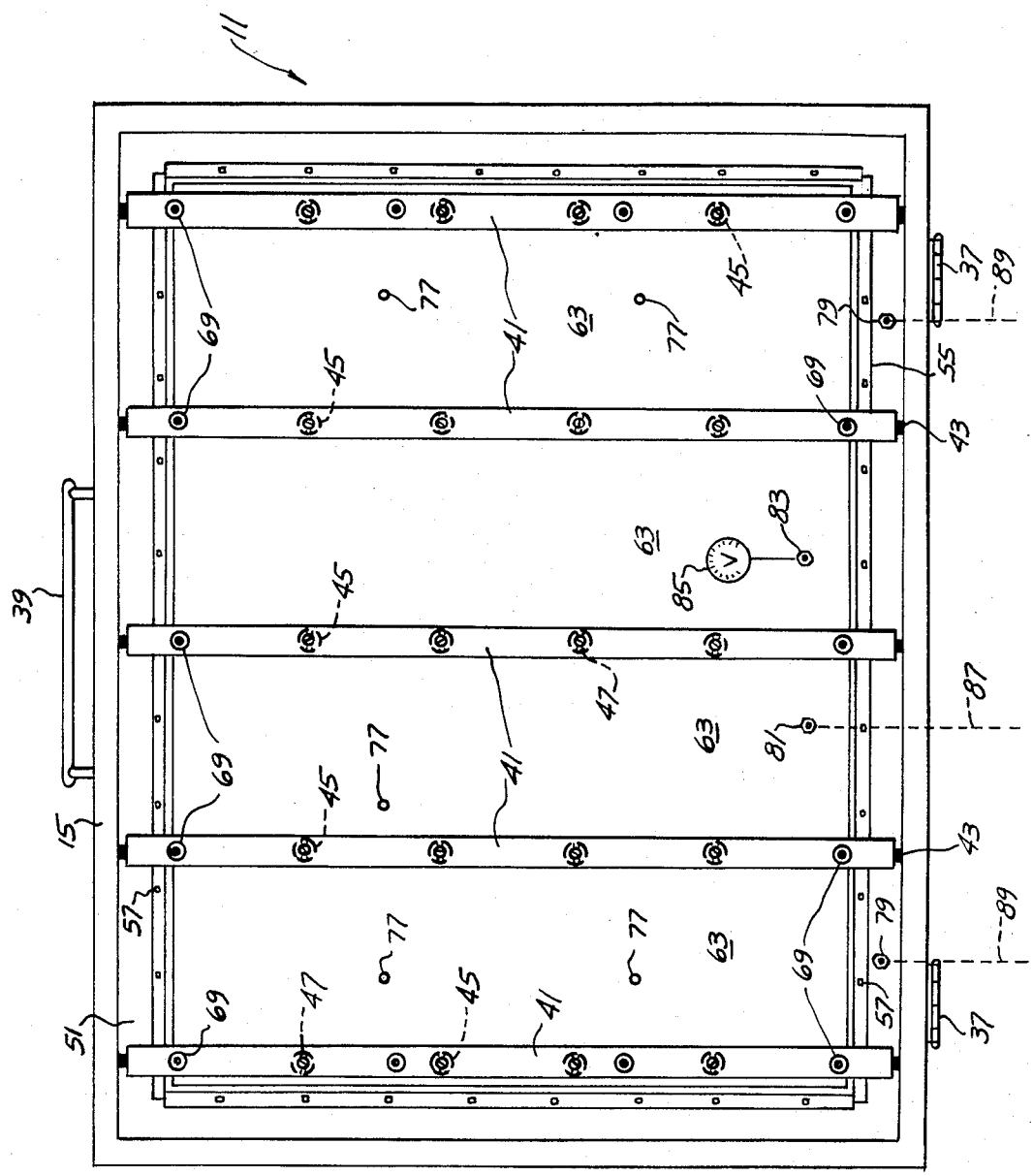
FIG. 1 is a bottom plan view of the present vacuum printer.
Figure 2:
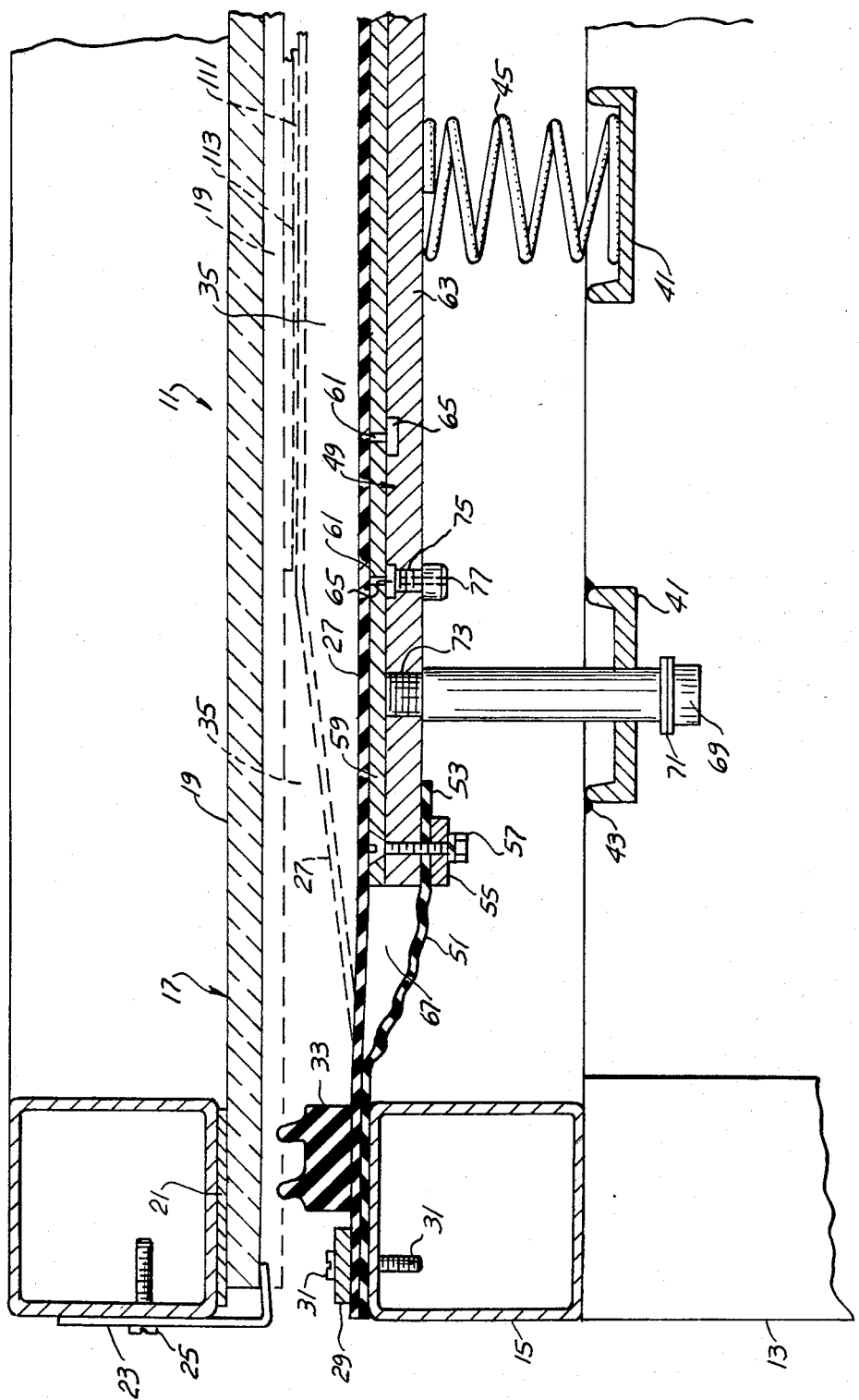
FIG. 2 is a partly sectioned fragmentary view of the present vacuum printer illustrating the relationship between the blanket frame and glass frame.

Referring to the drawings in FIGS. 1 and 2, there is shown a vacuum printer 11, sometimes referred to as a vacuum contact printer, particularly useful in the graphic arts, including a bed or base 13. Overlying and suitably secured to the bed is a horizontally disposed blanket frame 15, shown in cross section in FIG. 2. The blanket frame is of continuous tubular construction. Overlying and juxtaposed over the blanket frame is a similarly shaped rectangular glass frame 17.

In normal operation the glass frame 17 is directly positioned over blanket frame 15, FIG. 2, and is adapted for movement towards and away from the blanket frame. In the illustrative embodiment, the glass frame is pivotally mounted on one side by hinges 37, FIG. 1, to a corresponding side portion of blanket frame 15. Sometimes the glass frame is mounted for vertical movements relative to the blanket frame.

Handle 39 projects from one side of the glass frame to facilitate tilting of the glass frame with respect to the blanket frame through an arc approximately 90°, for loading and unloading. The foregoing construction is a conventional construction characteristic of prior art vacuum printers. The present improved vacuum printer includes an improved and modified blanket frame 15. A flexible blanket 27 constructed of rubber or neoprene or a laminate of rubber and canvas, for illustration, generally overlies the blanket frame and is secured thereto by a series of peripheral fasteners 31 threaded down into the blanket frame with anchor strips 29 interposed.

Inwardly of the fasteners 31, there is provided a continuous peripheral blanket beading 33 adhered by cement or otherwise to the top surface of flexible blanket 27, FIG. 2.

In assembly of the glass frame 17 and its glass 19 in engagement with the peripheral bead 33, there is defined a conventional vacuum printing chamber 35 known in the art. Forming a part of the glass frame and underlying the tubular frame portion thereof is a clear glass 19 which extends across the bottom of the glass frame and is mounted thereunder by the continuous support peripheral bracket 23 secured to the glass frame by a series of fasteners 25. A packing gasket 21 is mounted within the angle brackets and peripherally engages the glass throughout 360°.

A plurality of parallel laterally spaced rib channels 41, constructed of steel, for illustration, span the underside of blanket frame 15 and at their ends are secured thereto as by welding at 43, FIG. 1. A plurality of laterally spaced rows of longitudinally spaced low tension springs 45 supportably mounted upon and along the respective channels 41 and secured thereto by a spring retainer clips 47. Channels 41 are sometimes hereafter referred to as a support for the set of uniformly spaced low tension springs 45.

Figure 4:
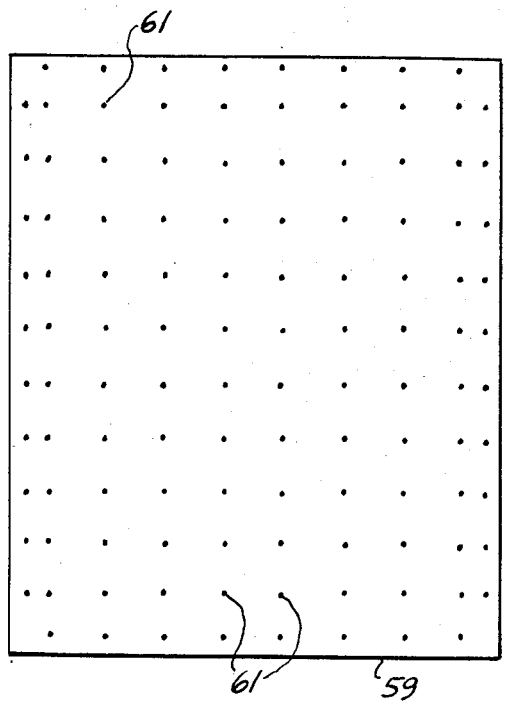
FIG. 4 is a plan view of the top layer of the PVC blanket support board.
Figure 3:
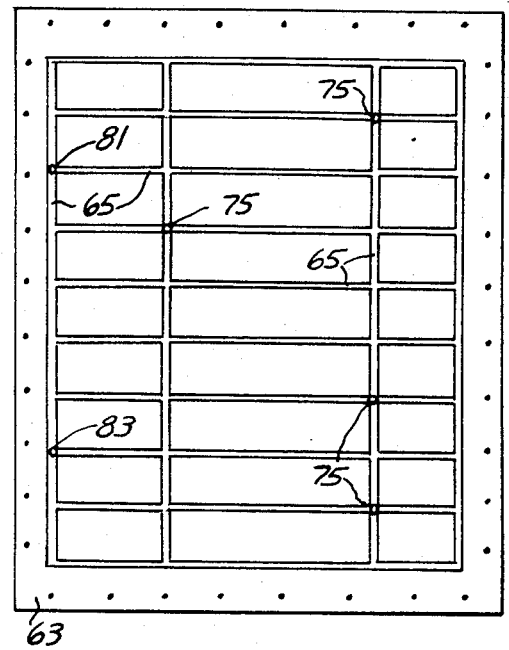
FIG. 3 is a plan view of the bottom support layer of the PVC board support for the blanket shown in FIG. 2 and on a reduced scale.

In the illustrative embodiment, these springs are calibrated to 3.5 pound per inch, approximately, and are adapted to provide a uniform yielding support for the present base plate 49, sometimes referred to as a polyvinyl chloride (PVC) cartridge or cartridge board, FIGS. 2, 3 and 4.

A flexible centrally apertured gum rubber skirt 51 and its outer margin peripherally overlies blanket frame 15 under corresponding peripheral portions of blanket 27 and is secured and sealed thereto by fasteners 31 and blanket stripping 29.

The interior peripheral portion of said skirt underlies the movable base plate or PVC cartridge 49 and is suitably secured thereto by corresponding blanket stripping 55 and a series of fasteners 57. These extend through the PVC cartridge 49, sometimes referred to as a yieldable base plate. The present PVC cartridge 49 is composed of a ⅛ inch PVC top sheet 59 which has therethrough a plurality of laterally spaced rows of longitudinally spaced vacuum ports 61, FIGS. 2 and 4.

The PVC cartridge or base plate 49 further includes the bottom PVC support sheet 63 which, in the illustrative embodiment, is one quarter inch thick and is routed at 65 upon its top surface so as to register with and underlie respectively the vacuum ports 61 of top sheet 59.

Routing 65 includes, as shown in FIG. 3, a plurality of parallel laterally spaced grooves of a uniform depth and a corresponding series of longitudinally spaced parallel transverse intersecting grooves. The respective grooves underlie and are in registry with the corresponding vacuum ports 61 of the top PVC sheet 59, as shown assembled in FIG. 2.

The blanket chamber or vacuum chamber 67 is thus defined by the interior portions of the gum rubber skirt 51, the spacing between the underside of blanket 27 and the top surface of the PVC cartridge assembly 49 and including the vacuum ports 61 and the routing 65.

The present PVC cartridge assembly is a lamination of the top and bottom PVC sheets 59 and 63 and is peripherally interconnected by fasteners 57 and in surface engagement and uniformly supported upon the series of longitudinally and laterally spaced springs 45, FIGS. 1 and 2.

A means is provided for guidably supporting the PVC cartridge 49, sometimes referred to as a yieldable base plate, for vertical movements thereof. The overlying blanket 27 is uniformly supported upon the base plate or cartridge 49. For this purpose there is provided upon each of the respective channels 41 a series of spaced upright shoulder bolts 69 which extend through suitable cartridge spacers 71. The shoulders of a shoulder bolts are normally spaced below the corresponding channel 41, FIG. 2, with the upper end of the shoulder bolts threaded at 73 or otherwise secured to PVC cartridge 49.

A plurality of variably spaced drilled holes 75, FIGS. 1, 2 and 3 are formed within lower sheet 63 of the PVC cartridge and are in registry with routing 65, schematically shown in FIG. 3.

A series of vacuum bleed screws 77 having variable sizes of interior air passages therethrough are threaded up into the drilled holes 75 into registry with routing 65, FIG. 2, to permit the introduction of air into vacuum chamber 67.

Figure 5:
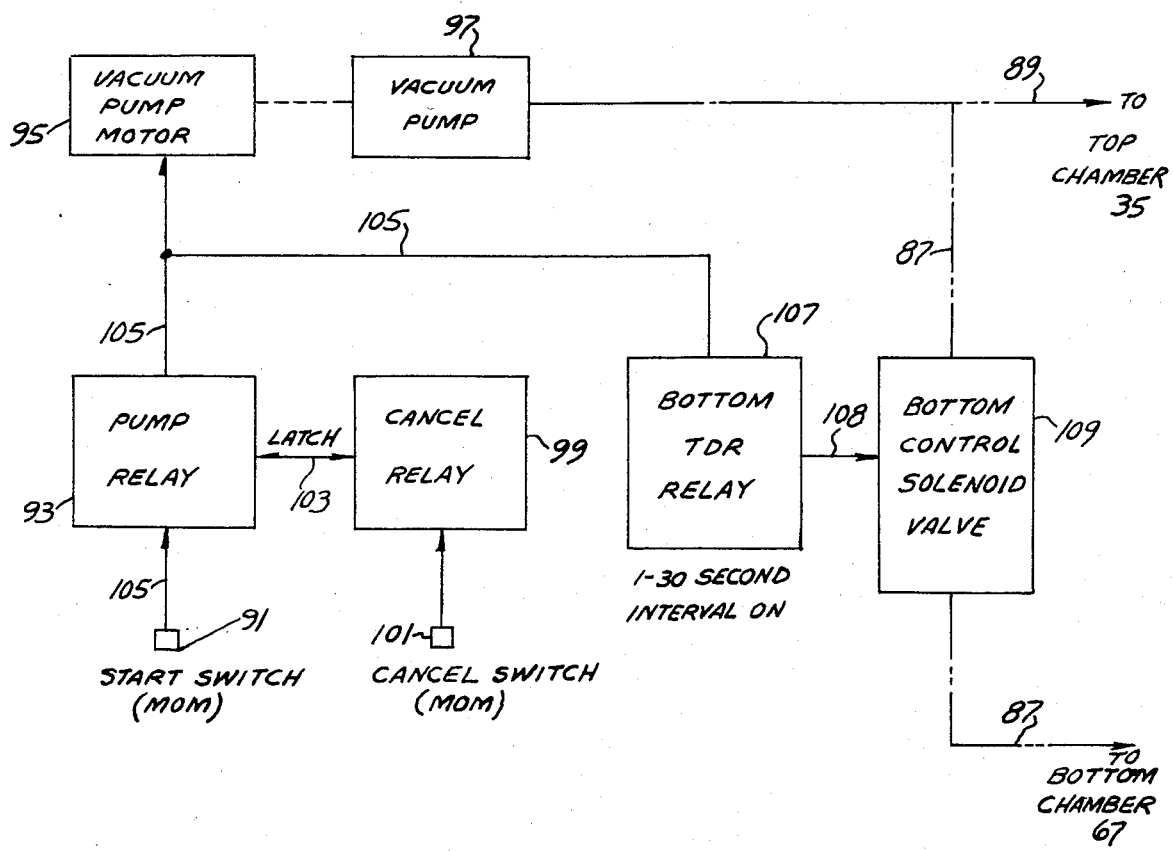
FIG. 5 is a schematic diagram showing the pneumatic connections and the electrical circuit control mechanism for the vacuum printer.

One or a pair of longitudinally spaced blanket valves 79 are mounted upon a portion of the blanket frame 15 and connected to a suitable first conduit 89, FIG. 5, to establish vacuum communication to vacuum printing chamber 35, FIG. 2.

At this time the glass frame 17 has been moved downwardly with respect to the blanket frame 15 so that the glass 19 is in the position shown in dash lines, FIG. 2, in cooperative sealing and compressive registry with the peripheral beading 33. This provides a sealed vacuum chamber 35 between the glass 19 and blanket 27.

A cavity vacuum output valve 81 underlies the base plate or support PVC cartridge 49 and extends through an aperture in the bottom sheet 63 of the cartridge 49, FIG. 3, and is in registry with routing 65.

Second vacuum conduit 87, FIG. 5, is connected to the cavity vacuum output valve 81 for communicating vacuum through the routing 65 and through the corresponding vacuum ports 61 of the PVC cartridge or base plate and into vacuum chamber 67.

Spaced from the cavity vacuum output valve 81 is the cavity vacuum test valve 83, FIGS. 1 and 3 which is connected to vacuum gauge 85 schematically shown in FIG. 1. This provides a means of visably indicating vacuum level and for regulating the extent of vacuum within vacuum chamber 67 when the vacuum printer is activated to provide a means of controlling the extent of vacuum within said chamber.

Referring to the schematic diagram, FIG. 5, the first conduit 89, from vacuum pump 97 is shown for establishing vacuum communication to blanket valves 79 to printing chamber 35, FIG. 2.

In the diagram there is provided start switch 91, which is momentarily activated, to energize through the electrical lead 105 the electrical circuit pump relay 93 and through lead 105 to the vacuum pump motor 95 driving vacuum pump 97. This establishes vacuum communication through the first conduit 89 to the vacuum printing chamber 35, and is a conventional construction.

Relay 93 is latched as at 103 to the cancel relay 99 connected to a momentarily actuatable cancel switch 101 for deactivating the pump relay and shutting down the motor 95. The electrical circuit includes a bottom time delay relay 107 which is normally open and which can be preset for an interval of one to 30 seconds for illustration.

Relay 107 in the circuit is connected to the bottom solenoid control valve 109 which is interposed in the second vacuum conduit 87 which communicates with the first vacuum conduit 89 for establishing vacuum communication to vacuum chamber 67, FIG. 2.

Initially when the vacuum printer is set up and with the glass frame pivoted to an open position or otherwise separated from the blanket frame, there is applied to the blanket 27 sensitized sheet 111, shown in dash lines and thereover a negative 113. In the illustration shown in FIG. 2, the blanket 27 is shown in dash lines in its elevated contact printing position with the assembly of the sensitized sheet 111 and the negative 113 snugly against the bottom surface of glass 19, shown in dash lines in its sealed position with respect to blanket beading 33.

Thus the contact printer is ready for printing just as soon as proper complete vacuum has been established within vacuum printing chamber 35 and there is a perfect contact between the negative 113, sensitized sheet 111 with the glass 19.

OPERATION

Because of the nature of the PVC cartridge 49, sometimes referred to as the yieldable base plate which mounts the blanket 27, "pin breaks" of the glass are eliminated because of the nature of the PVC cartridge as being non-metallic, and the presence of the PVC board support springs 45. The PVC material is preferable over metals, such as aluminum, shown in the copending application. It is less hard, though still basically rigid, and considerable lighter in weight. The light PVC cartridge consisting of the laminated top and bottom strips 59 and 63, is supported by surface engagement upon the set of low tension springs 45. This provides a very force sensitive surface. A light force on the blanket 27 will cause the PVC cartridge 49 to move downward uniformly compressing springs 45. This movable base plate is able to relieve the force on a register pin or pins which may be employed in the printing chamber for normally holding down or locating the printing material including the sensitized sheet 111 and the negative 113, FIG. 2. When the glass begins to flex because of the uneven air pressure, the pin will not interfere with the flexing of the glass 19. The pin will be lowered by the compression upon the base plate assembly 49 and the glass will behave in a manner similar to the case where there are no pins in the printing chamber.

The problem of glass implosions has been solved by the precise control of the cavity vacuum level within vacuum chamber 67 employing a series of variably set vacuum bleed screws 77. The present vacuum printer allows less restricted vacuum pump power to the cavity regions 67 than was involved in the copending application. The vacuum to vacuum chamber 67 is communicated through the valve 81, FIGS. 1 and 3 which lies flush with the routing 65 of the lower PVC support sheet 63.

Vacuum bleed screws 77 extend through the lower sheet 63 of the PVC cartridge in communication with the routing 65, FIGS. 2 and 3. This provides a means of bringing the cavity vacuum within vacuum chamber 67 to the desired level. This desired level is achieved and maintained because of the outward flow of air through the pump line 87 is exactly equal to the inward flow of air through bleed screws 77.

The vacuum gauge 85, FIG. 1, is placed on vacuum test valve 83, FIGS. 1 and 3, and is used for the precise setting of the cavity vacuum level in chamber 67.

This level is set below the danger point for glass implosion, and yet high enough to allow proper functioning of the system. The vacuum level is very stable because it is governed by a steady state. The period of time that the pump 97 draws from cavity 67 is not a factor in the level of vacuum reached. The end result is that the cavity vacuum level is consistent over many runs of the vacuum printer. This is crucial because if the level goes beyond the danger level, glass implosion is likely.

This method of controlling the cavity vacuum in vacuum chamber 67 is also advantageous because the desired vacuum level is attained quickly, since constricted pump flow is no longer used as the means to control cavity vacuum as in the copending application.

The desired cavity vacuum is also obtained quicker because there is less volume of air to be evacuated from chamber 67 including the vacuum ports 61 and routing 65. The only air in the cavity is the air inside the routing 65 and the air within vacuum ports 61 and space between the rubber skirt 51 and blanket 27.

The end result is that there is no longer the need for what was previously called the first cycle on the copending applications. This was for 10 seconds at the beginning of the operation of the unit in the copending application, with just the blanket chamber evacuated. Here the evacuation of cavity 67 and the evacuation of printing chamber 35 begins simultaneously. This reduces the time it takes to achieve perfect contact between the glass 19 and the blanket 27, shown in dash lines in its extended printing position in FIG. 2.

Eliminating the need for the first cycle, also simplifies the electrical pneumatic aspects of the system, FIG. 5. Only one time delay relay 107 and one solenoid control valve 109 is required as distinguished from the copending application wherein there were a pair of solenoid control valves and a pair of time delay relay switches or timers.

The improved electrical pneumatic system, FIG. 5, functions in the following manner. The start momentary switch 91 is depressed causing the pump relay 93 to energize. This delivers power to vacuum pump motor 95 coupled to vacuum pump 97, which begins evacuating the printing chamber 35.

At the same time that the pump relay is energized, the bottom time delay relay 107 is also energized. This gives power to the bottom vacuum control solenoid valve 109 and allows evacuation of vacuum cavity 67 for a selectable one to 30 seconds. In the illustrative embodiment said evacuation occurs in approximately 10–25 seconds.

At the end of the selected time interval, bottom solenoid 109 closes and the evacuation of air from cavity 67 ceases. Depressing the cancel momentary switch 101 breaks the latching circuit to the pump relay 93 stopping pump motor 95. The time interval for the time delay relay 107 is selected in order to minimize the time for perfect contact.

The time to achieve perfect contact is further reduced by the use of the present shoulder bolts 69 and cartridge spacers 71 to control the upward movement of the PVC cartridge 49.

In the copending application the apertured aluminum base plate was immovable, and therefore had to be secured at a reasonable distance from the glass to allow for various thickness of material to be placed in the printing chamber. This relatively large gap between the glass and the blanket in the copending application increased the time necessary to achieve perfect contact within vacuum printing chamber 35.

In the present contact printer, the PVC cartridge 49 is movable so that the gap between the glass and the PVC cartridge can be relatively small unless the thickness of the material 111 or 113 warrants otherwise.

The PVC cartridge 49 can advantageously rise up from the force of vacuum created in printing chamber 35. However the PVC rising upward is only advantageous up to a point where it is still not touching the glass 19. If the PVC touches the glass it will trap air in that area. Therefore the shoulder bolts 69 are used to restrict the upward movement of the PVC cartridge 49. For any particular unit the proper number of cartridge spacers 71 are added so that the PVC cartridge 49 can move upward but not to such extent that it touches the glass.

Having described our invention reference should now be had to the following claims.

We claim:

1. In a vacuum printer for the graphic arts, having a bed, a blanket frame upon said bed including a flexible impervious blanket having a peripheral sealing bead, a glass frame including a glass juxtaposed with the blanket frame and with said glass in snug flexing and sealing registry with said bead, defining a contact printing chamber, means movably mounting the glass frame for opening and closing movements relative to said blanket frame, a vacuum source having a first vacuum conduit communicating with said printing chamber for evacuating said printing chamber; the improvement comprising:

a support mounted upon and underlying said blanket frame;

a non-metallic base plate yieldably positioned within and peripherally spaced from said blanket frame, supportably underlying said blanket;

a plurality of uniformly spaced spring means interposed between said support and said base plate, uniformly supporting said base plate;

a continuous centrally apertured skirt of flexible imperforate material along its outer periphery sealed upon said blanket frame, and along its inner periphery sealed against peripheral portions of said base plate;

said skirt and base plate defining with said blanket a vacuum chamber;

a second vacuum conduit interconnecting said first vacuum conduit and said vacuum chamber initially retaining said blanket upon said base plate; and a control means connected to said second conduit for simultaneously evacuating said vacuum chamber and regulating its vacuum level with respect to the vacuum level in said printing chamber, and after a preset period cutting off vacuum from said vacuum chamber;

said base plate and blanket thereon adapted for uniform upward movement relative to said glass under the combined action of atmospheric air pressure and said spring means, said blanket then disengaging from the base plate and supportably engaging the glass.

2. In the vacuum printer of claim 1, said support including a plurality of upwardly facing channels spanning and at their ends secured to said blanket frame, said spring means being nested and anchored upon said channels.

3. In the vacuum printer of claim 2, said spring means including a plurality of springs, the anchoring of said springs including a plurality of spring retainers secured upon said channels.

4. In the vacuum printer of claim 1, said base plate being constructed of polyvinylchloride.

5. In the vacuum printer of claim 1, said base plate comprising a cartridge board consisting of a pair of registering peripherally interconnected sheets of PVC.

6. In the vacuum printer of claim 3, said springs being low tension springs of 3.5 pounds/inch, approximately.

7. In the vacuum printer of claim 5, said sheets including an upper sheet having formed therethrough and uniformly over its surface a plurality of laterally spaced rows of longitudinally spaced vacuum ports; and a lower sheet underlying said upper sheet and having in its upper surface a continuous routing in registry with all said vacuum ports; and a cavity output vacuum valve underlying said lower sheet in communication with said routing and connected to said second conduit.

8. In the vacuum printer of claim 7, said lower sheet being thicker than said upper sheet.

9. In the vacuum printer of claim 7, said vacuum ports and routing and the spaces between said skirt and base plate and said blanket forming a part of said vacuum chamber.

10. In the vacuum printer of claim 7, said upper sheet of PVC being ⅛ inch thick approximately and said lower sheet of PVC being ¼ inch thick approximately.

11. In the vacuum printer of claim 1, stop means connected to said base plate for limiting upward movement of said base plate and for spacing said base plate from said glass.

12. In the vacuum printer of claim 11, said stop means including a plurality of shoulder bolts guidably extending through said support and secured to said base plate, the shoulders of said bolts being normally spaced from said support, said shoulder bolts adapted for limited adjustments in opposite directions relative to said support, said shoulders limiting movement of said base plate towards said glass and spacing said base plate therefrom.

13. In the vacuum printer of claim 2, stop means connected to said base plate for limiting upward movement of said base plate and spacing said base plate from said glass;

said stop means including a plurality of shoulder bolts guidably extending through said channels and secured to said base plate, the shoulders of said bolts being normally spaced from said channels, said shoulder bolts adapted for longitudinal adjustments in opposite directions relative to said channels, said shoulders limiting movement of said base plate towards said glass.

14. In the vacuum printer of claim 13, at least one cartridge spacer mounted upon said shoulder bolts underlying said channels respectively.

15. In the vacuum printer of claim 7, said routing including a series of laterally spaced channels of uniform depth, and a series of longitudinally spaced transverse intersecting channels of uniform depth, said channels underlying said vacuum ports respectively.

16. In the vacuum printer of claim 7, a cavity vacuum test valve spaced from said output vacuum valve underlying said lower sheet and in communication with said routing; and a vacuum gauge connected to said test valve for measuring said vacuum level in said vacuum chamber.

17. In the vacuum printer of claim 7, there being a plurality of spaced vacuum bleed holes through said lower sheet communicating with said routing; and corresponding vacuum bleed screws with variably sized openings projected into said bleed holes, providing a continuous regulated flow of atmospheric air into said vacuum chamber to control the vacuum level and to bring the cavity vacuum to a predetermined level.

18. In the vacuum printer of claim 1, said vacuum source including an electric motor operated vacuum pump outleting to said first conduit;

said control means including a solenoid control valve in said second conduit;

an electric power circuit connected to said solenoid control valve and motor; and a preset timer in said circuit for closing said valve after a predetermined period.

19. In the vacuum printer of claim 18, said timer being a time delay rely set for a 1 to 30 second interval on.

20. In the vacuum printer of claim 1, said spring means being spaced and arranged in laterally spaced rows.

* * * * *